Dec. 22, 1970  T. F. PRICE, JR  3,548,447
APPARATUS FOR HUMANELY KILLING MINKS AND THE LIKE
Filed Aug. 25, 1967  3 Sheets-Sheet 1

INVENTOR:
THOMAS F. PRICE, JR.
BY:
ATTORNEY.

Dec. 22, 1970    T. F. PRICE, JR    3,548,447
APPARATUS FOR HUMANELY KILLING MINKS AND THE LIKE
Filed Aug. 25, 1967    3 Sheets-Sheet 2

INVENTOR:
THOMAS F. PRICE, JR.
BY:
*B. Dan Cradle*
ATTORNEY.

Dec. 22, 1970   T. F. PRICE, JR   3,548,447
APPARATUS FOR HUMANELY KILLING MINKS AND THE LIKE
Filed Aug. 25, 1967   3 Sheets-Sheet 3

INVENTOR:
THOMAS F. PRICE, JR.
BY:
ATTORNEY.

United States Patent Office 3,548,447
Patented Dec. 22, 1970

3,548,447
APPARATUS FOR HUMANELY KILLING
MINKS AND THE LIKE
Thomas F. Price, Jr., Rte. 1, Box 25,
Manhattan, Mont. 59741
Filed Aug. 25, 1967, Ser. No. 663,367
Int. Cl. A22b 3/00
U.S. Cl. 17—1                                                 6 Claims

ABSTRACT OF THE DISCLOSURE

Method and apparatus for rapidly and humanely executing animals such as minks, the apparatus including at least one vacuum chamber adapted to receive the animals and means for creating a sub-atmospheric pressure in the chamber for a sufficient time after the animal is placed therein to suffocate it to death. Means are provided for automatically restoring atmospheric pressure to the chamber after the animal has expired.

BRIEF DESCRIPTION

Figure 1:
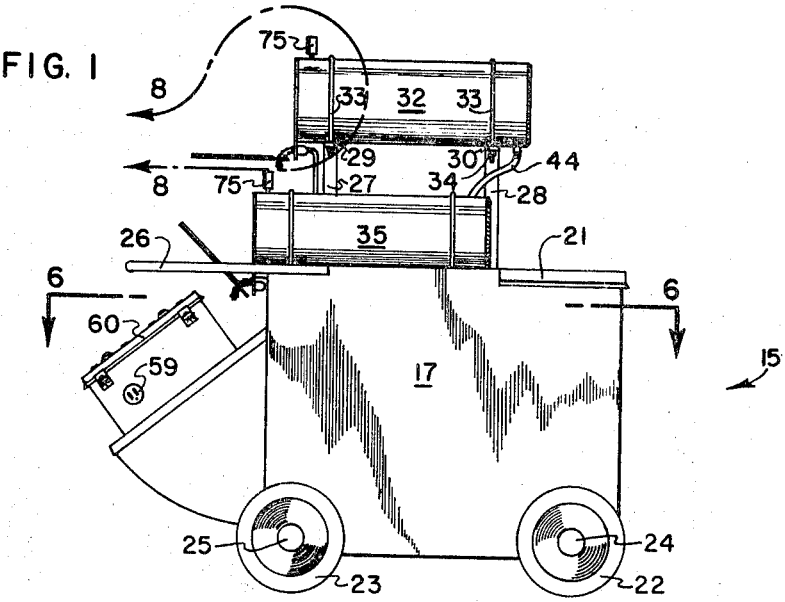

There has long been a need for a process of and machine for quickly and humanely executing mink and other such animals that must be killed for their pelts or for other purposes.

Minks present some rather unusual problems when it is necessary to kill them. There is only a limited period during each year when the pelt of a mink achieves full bloom and if the rancher is to obtain full value for his pelts the animals must all be killed within this short period of time, i.e. about two weeks. Therefore, it often becomes necessary for a large rancher to kill a great many animals within a very short period of time.

With minks, as with other animals raised for their pelts, care must be taken to see that the pelts are not in any way damaged as the animals are killed. Blood on the pelts will stain them and if hairs are broken off or pulled out the value of the pelts are also reduced. Also, chemicals cannot be allowed to adversely affect the pelts.

Minks are easily upset and, when distraught, are very cannibalistic. Thus, in the past, it has been necessary to catch the animals ot be killed and to move them far away from the rest of the herd. Otherwise, the cries of the animals being killed would disturb the remainder of the herd, causing the older animals to fight one another and to devour the younger kittens.

Various ways of killing the animals have been tried in the past. They have been placed in cyanide chambers, for example, but the cyanide sometimes has a detrimental effect on the pelts. Also, cyanide chambers work slowly and the animals may mutilate themselves by chewing off a foot or biting themselves in the brisket. In addition the use of cyanide is very dangerous, since the pelts must be cleared of the gas before an operator can work with them safely in a confined space. Because of the foreign smell of the cyanide in the chamber the minks balk at entering it and may become so excited that they injure themselves fighting against being put in or fighting amongst themselves after being put in. The cost of operating such a chamber prohibits its being used to individually kill the mink, so group killing is necessary.

Another more commonly used method of killing the animals is to individually inject them with a nicotine solution or other chemical that will quickly kill them. This process is rather costly and is also dangerous since it is difficult to inject a squirming and squealing mink, without the person giving the injection jabbing himself. The nicotine solution also causes the animal's fatty tissue to harden, thereby increasing the difficulty in "fleshing-out," i.e., removing the flesh from the pelts.

Because of the difficulty, expense, and danger inherent in these and other known processes, the most common way of killing minks has continued to be hand killing by the rancher or his assistants. In this operation the man holds the animal's body between his legs and breaks its neck. The man must wear heavy gloves to protect him against being bitten and the method is slow and difficult since each animal is resisting to his full extent. With this process, as well, the pelt is sometimes blood stained and damaged. Hand killing of the mink is very hard work and is slow, since after killing a few mink, the rancher or assistant must take a rest.

It is an object of the present invention to provide a process and machine for inexpensively, quickly and easily killing minks or the like.

Other objects are to provide such a machine that will not frighten the minks to be killed, and that will individually kill them in a quiet manner that does not disturb the remainder of the herd, even though it may be used in close proximity to the herd.

Principal features of the invention are the vacuum chambers arranged to receive the animals and preferably including slide trays to facilitate removal of their carcasses; a vacuum tank to provide a means for substantially instantaneously creating a sub-atmospheric pressure in the vacuum chambers and a control circuit for creating the sub-atmospheric pressure condition in the vacuum chambers for a predetermined period of time following closure of the doors to the chambers and for thereafter reestablishing atmospheric pressure in the chambers.

Additional objects and features will become apparent from the following detailed description and drawings, disclosing what is presently contemplated as being the best mode of the invention.

THE DRAWINGS

Figure 2:
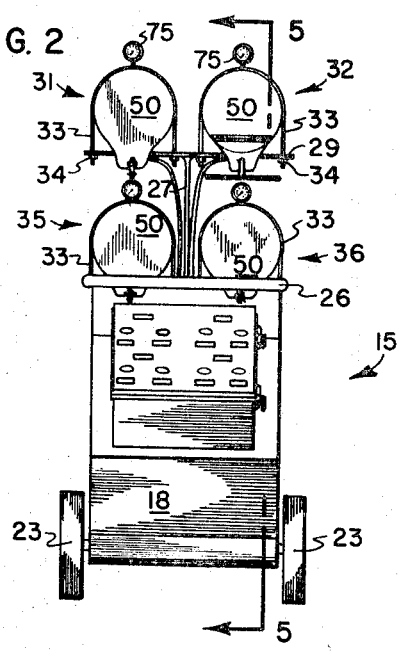
Figure 3:
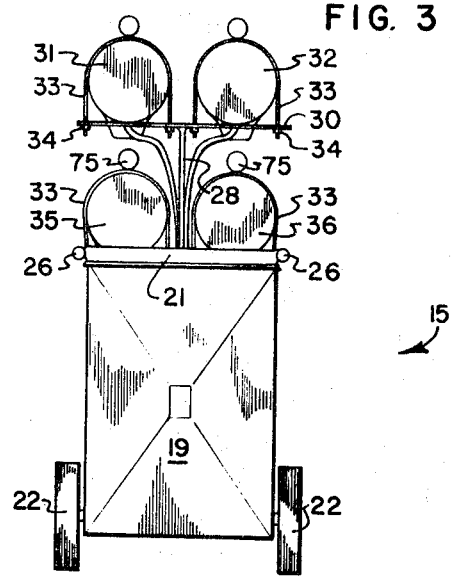
Figure 4:
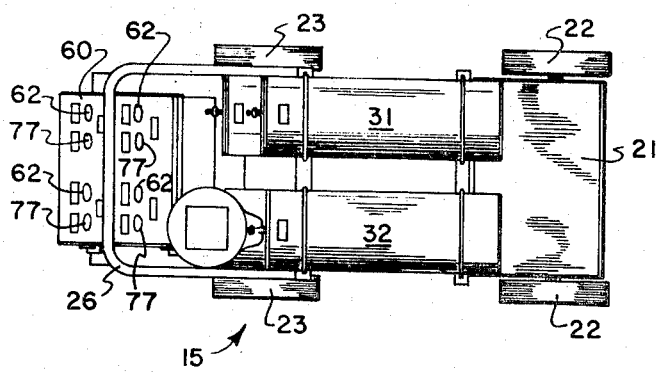
Figure 5:
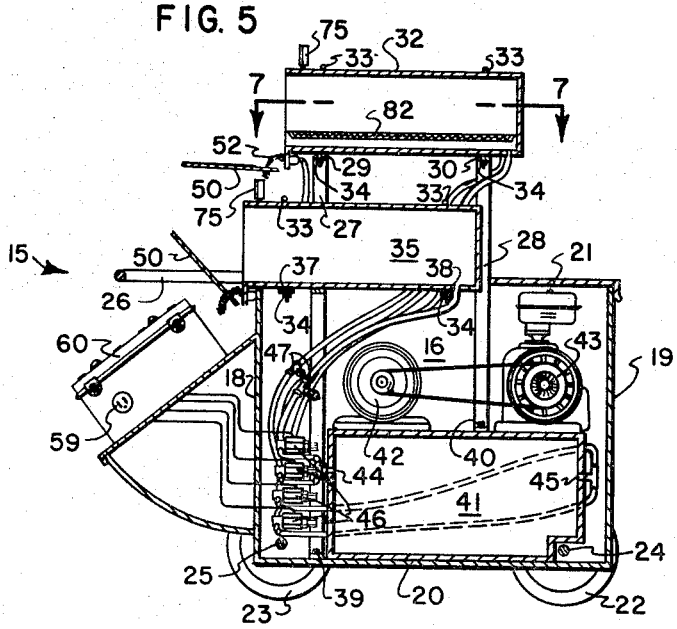
Figure 6:
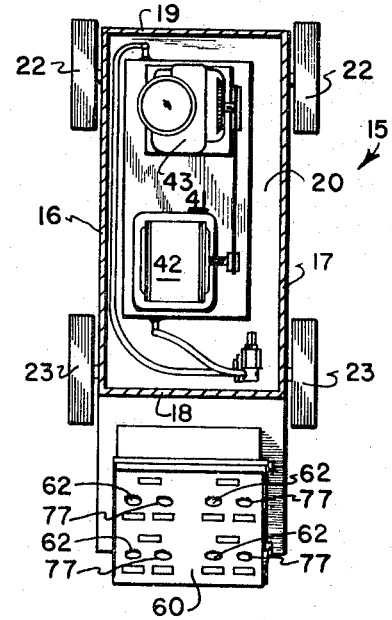

FIG. 1, is a side elevation view of the machine of the invention;

FIG. 2, an elevation view of one end;

FIG. 3, an elevation view of the other end;

FIG. 4, a top plan view;

FIG. 5, a vertical section taken on the line 5–5 of FIG. 2;

FIG. 6, a horizontal section, taken on the line 6–6 of FIG. 1 with the support post for the cannisters omitted.

Figure 7:
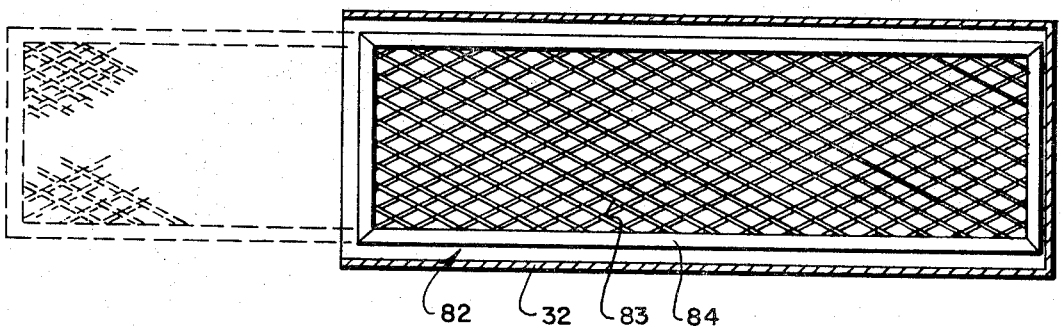
Figure 8:
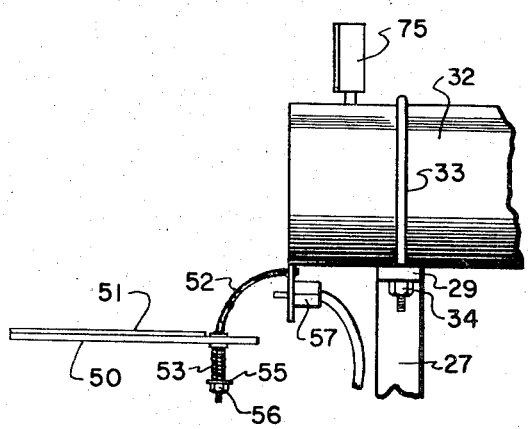
Figure 9:
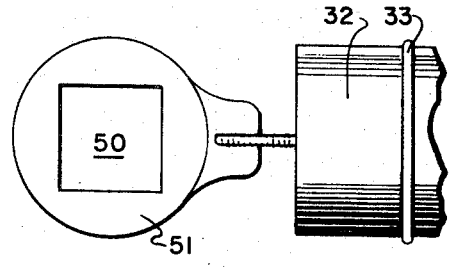

FIG. 7, an enlarged horizontal section, taken on the line 7–7 of FIG. 5;

FIG. 8, an enlarged, fragmentary view of the portion of the invention shown within the line 8–8 of FIG. 1;

FIG. 9, a top plan view of the portion of the invention shown in FIG. 8; and

Figure 10:
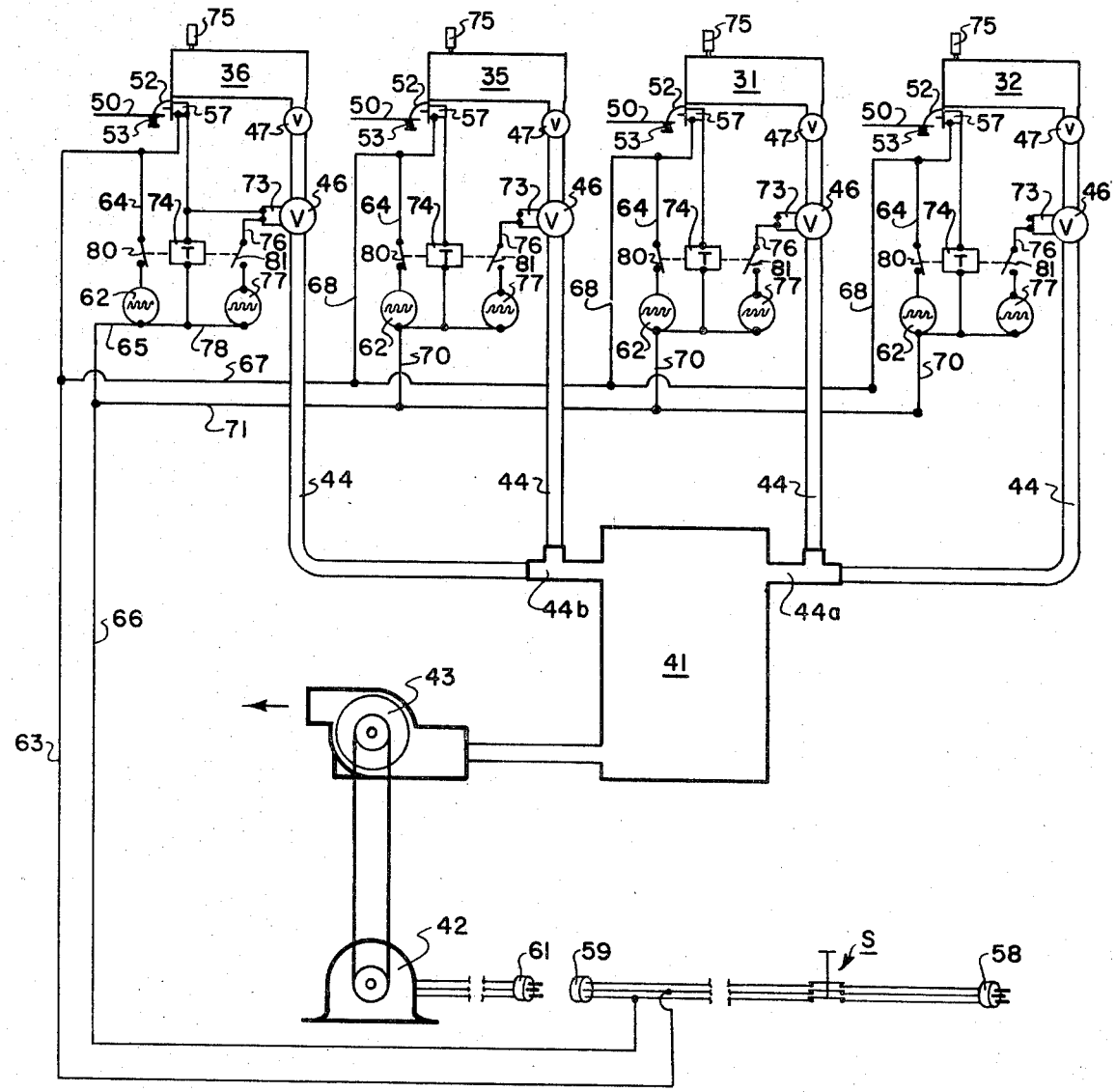

FIG. 10, a schematic diagram of the electrical control circuit and the vacuum circuit of the invention.

DETAILED DESCRIPTION

Referring now to the drawings:

In the illustrated preferred form of the invention the machine includes a mobile cabinet 15 made up of side walls 16 and 17, end walls 18 and 19, interconnecting the side walls, a base 20 interconnecting the side walls and the end walls and a top cover 21 partially closing the top of the cabinet.

Pairs of front and rear wheels 22 and 23, respectively, are journaled for rotation on front and rear axle shafts 24 and 25, extending through the side walls and a wrap-around handle 26 fastened to the side walls at the upper rear of the cabinet provides gripping means for pushing the machine on the wheels.

Support posts 27 and 28 project upwardly through the portion of the top of the cabinet not covered by top cover 21 and have cross-arms 29 and 30, affixed thereto. Upper canisters 31 and 32 are mounted, front and rear, respectively on the cross-arms by U-shaped rods 33 passed over the canisters, and through holes in the cross-arms. The rods are held in place by nuts 34 threaded onto their ends. Lower canisters 35 and 36 are mounted on cross-braces 37 and 38 extending between the opposite side walls 16 and 17 and are similarly held in place by additional U-shaped rods 33 and nuts 34.

Support post 27 is bolted at 39, FIG. 5, to base 20 and post 28 is bolted at 40 to the top of a vacuum reservoir tank 41 that is supported on base 20.

An electric motor 42 and a vacuum pump 43 are also mounted on top of tank 41 and the motor drives the pump which has its intake connected to evacuate the tank. Both the motor and pump are readily available, conventional items.

A vacuum line 44 is attached to the bottom rear of each canister and connects the vacuum chamber inside the canister with the inside of vacuum reservoir tank 41.

The lines 44 interconnecting canisters 31 and 32 and tank 41, are connected to a T-fitting 45, coupled at one end of the tank and the lines 44 interconnecting the other canisters 35 and 36 are similarly connected through a T-fitting 44b at the other end of the tank.

Each line 44 has a solenoid valve 46 therein that is normally closed, but that is opened whenever the machine is being used and the door of the canister to which the line 44 containing the valve is connected, is closed, all as will be further explained.

A pressure control valve 47 is also positioned in each line 44, to open the line to atmosphere whenever the vacuum therein exceeds a predetermined set amount. A model 30317 valve manufactured by the Allied Control Co., Inc. has been found very satisfactory for this purpose.

The canisters 31, 32, 35, and 36 are identical and, as illustrated, are cylindrical, with their rear ends closed. The electrical control circuit for each canister is essentially the same and the description hereinafter set forth will apply to each canister, except where otherwise noted.

The front ends of the canisters are open, but are adapted to be sealed by a plate 50, having a face large enough to completely cover the open front end of the canister The face of the plate 50 has a gasket 51 adhesively fixed thereon to engage the canister and provide a seal between the cover and the canister.

A spring 53 surrounds finger 52, between the plate 50 and a washer 55, held in place on the opposite end of finger 52 by a nut 56.

In its normal expanded condition, with the plate 50 positioned intermediate the length of finger 52, the spring exerts very little pressure on plate 50. However, when plate 50 is moved further towards nut 56, spring 53 is compressed and will then more fully assist in returning the plate towards its canister closing position when the plate is released. Because of the binding between the hole through plate 50 and the curved finger 52, the plate will remain in any set open position. When the plate is raised slightly, the spring 54 acts to move the plate toward the open end of the canister. The plate 50 will seal the end of the canister so long as a vacuum exists in the canister. However, when atmospheric pressure is re-established in the canister, as will be explained, the plate 50 will be released to fall away from the end of the canister.

The sequence of operation of each canister is started by plate 50 engaging a contact of a switch 57, FIG. 8, located at the front of the canister, when the plate is positioned against the open end of the canister.

The machine is arranged to be electrically connected by a plug 58 to a source of power and an outlet 59, mounted in the side of control panel 60, FIGS. 1 and 5, will then be available to receive a plug 61 from the motor 42 that drives the vacuum pump of the machine. A control switch S may be provided. The motor 42 will be operated by the usual motor control switch, not shown. Connection of plug 58 to a source of power and closing of control switch S completes a circuit to each of the colored lights 62, there being one light 62 for each canister, to show that the canister is empty and ready for use.

The circuit to light 62 of canister 38 is completed through lines 63, 64, the light 62 and lines 65 and 66. The lights 62 of the other canisters are each connected by lines 67, 68, 69, 70, and 71 between lines 63 and 66.

A mink rancher, or his assistant, will obtain the mink to be killed from its pen using a handling cage, i.e. a cage in which the mink has been accustomed to being handled, and will move the caged mink to the machine 15. It should be noted that machine 15 can be used in close proximity to the mink pens and will normally be moved between them by trailing an extension cord from the source of power.

The plate 50, of the canister to be used, is opened and the door to the handling cage (not shown) is placed against the open end of the canister and the mink is urged out of the cage and into the canister. Since the canister contains no foreign smell, but instead, after prior use, contains a mink smell, the mink readily and quietly moves into the vacuum chamber formed by the interior of the canister.

Plate 50 is closed against the end of the canister as the cage is withdrawn and closing of the plate automatically closes the switch 57.

Closing of switch 57 completes a circuit from line 63 through the switch and a solenoid 73 of solenoid valve 46 to open the valve and also completes the operating circuit through a timer 74, to start operation of the timer.

Valve 46 will then be held open to allow air in the canister to be withdrawn through vacuum line 43 to the evacuated tank 41 and a sub-atmospheric pressure will be created and maintained until the timer times out and the circuit through solenoid 73 of the valve is broken. In practice, it has been found that the pressure in the canister, as measured by a gauge 75 mounted on the top of the canister, will immediately drop to about eighteen inches of mercury and during the brief time that the vacuum is maintained will reach a reduced pressure of twenty-three inches of mercury.

Although a short time period may be sufficient, I have found that a timer that will time out after the pressure in the vacuum chamber has been reduced, as set forth above, for about two minutes, will be very adequate. An Agastat timer, manufactured by the Elastic Stop Nut Corp. of America of Elizabeth, N.J., has been found very satisfactory for the purpose.

While the timer is operating, a circuit is also completed through a line 76, another light 77, and a line 78. Light 77 indicates that the canister is in use and the light remains lighted and coil 79 remains energized until the timer times out. During the period that the timer 74 is energized switch 80 in the line 64 leading to light 62 is opened and the circuit to the light 62 is broken. At the same time switch 81 in line 76 is closed thereby completing the circuit to light 77 to show that the chamber is in use.

Thus, depending upon which of the lights 62 or 77 is lighted, an operator can immediately determine the condition of each canister. The lights 62 and 77 are arranged on control panel 60 in pairs such that the lights 62 and 77 for each canister are arranged together and can be easily viewed by an operator. Identification plates for the canisters and plates identifying the lights can also be arranged on the control panel, if desired.

After timer 74 has timed out, valve 46 is returned to its position closing line 74 and admitting atmospheric pressure from port 81 into the vacuum chamber inside the canister, light 77 is turned off and light 62 is turned on to indicate that the vacuum chamber is ready to receive another animal.

As soon as the pressures inside and outside the canister are equal, the plate 50 falls away from the end of the canister and an operator can readily further move the plate to remove the carcass of the animal and to place the canister in condition to receive another animal to be killed.

The canisters are each independently operated, and with the machine shown, as many as four minks can be killed every two minutes and a dead mink can be removed every thirty seconds. Obviously, more or fewer canisters can be provided, as desired.

While it is a simple matter to reach into the canisters and pull out the dead animals, it is preferred that a sliding tray, such as that shown in detail at 82, FIG. 7, be used. The platform portion 83 of tray is of wide mesh material to allow the animals to readily walk onto it and has a peripheral frame 84 that will slide into and out of the lower portion of a cylindrical canister, while resting on the interior wall of the canister. When used, the tray containing the carcass of an executed animal is slid out and the carcass is removed therefrom.

The machine is fast, quiet and inexpensive to operate. It does not frighten the animals and it performs its function with a minimum of suffering on the part of the animal.

Observation has shown that the vacuum suffocates the animals so quickly that they do not even momentarily thrash about within the vacuum chamber.

Although a preferred form of my invention has been herein disclosed, it is understood that the present disclosure is made by way of example and that variations are possible without departing from the subject matter encompassed within the scope of the following claims, which subject I regard as my invention.

I claim:

1. A machine for killing minks and the like comprising:

at least one housing providing an elongate vacuum chamber sealed at one of its ends and having an opening at the other end thereof;

means for sealingly closing the open end of each such chamber, each said means including a plate, a gasket on the plate adapted to engage the open end of the housing, and means for securing said plate to the housing whereby the plate and gasket can be moved into sealing engagement with the open end or into a position whereby the open end is unobstructed; and means responsive to sealing of the open end to apply a vacuum to the chamber for a predetermined time and to thereafter admit atmospheric pressure to the chamber, said means including a source of vacuum, conduit means interconnecting said source of vacuum and said chamber, valve means in said conduit means, and circuit means including a switch carried by the housing and positioned to be engaged and closed by the plate when the plate is positioned to close the open end, whereby the valve means is operated through the said circuit means; and support means for positioning minks or the like in the chamber away from the connection of the chamber and the conduit means.

2. A machine according to claim 1, wherein the support means comprises:

perforated platform means adapted to slide into and out of each chamber through the open end thereof.

3. A machine, as in claim 1, wherein the means to apply a vacuum to the chamber includes:

a vacuum reservoir tank;

a vacuum pump having its intake connected to said tank;

a motor, operated by closing of the switch, for driving said pump;

a vacuum line connecting the tank and the vacuum chamber; and a valve in the vacuum line for controlling flow between the vacuum reservoir and the vacuum chamber and between the vacuum chamber and atmosphere.

4. A machine according to claim 3, wherein the means to apply a vacuum to the chamber further includes:

a timer; and circuit means including the switch for starting said timer upon sealing of the vacuum chamber and for operating the valve to place the vacuum chamber in communication with the vacuum reservoir tank during operation of the timer and in communication with atmosphere when the timer is stopped.

5. A machine according to claim 4, further including:

means supporting each of the vacuum chambers and the means to apply a vacuum to the said chambers; and wheels on said supporting means, whereby the machine is portable.

6. A machine according to claim 4, wherein the circuit means further includes:

a first light, energized when the motor is started;

a second light, energized during the period the timer is operating; and means for de-energizing said first light while said second light is energized.

References Cited

UNITED STATES PATENTS

| | | | |
|---|---|---|---|
| 1,020,690 | 3/1912 | Frey | 43—58X |
| 1,591,932 | 7/1926 | Young | 141—66X |
| 2,128,227 | 8/1938 | Bach | 141—66 |
| 2,535,870 | 12/1950 | Sedwick | 53—85 |
| 2,761,604 | 9/1956 | Bryant | 141—66X |

LUCIE H. LAUDENSLAGER, Primary Examiner

U.S. Cl. X.R.

43—58